United States Patent

[11] 3,607,686

| [72] | Inventor | Paul Buecheler<br>Reinach/BL, Switzerland |
|---|---|---|
| [21] | Appl. No. | 827,907 |
| [22] | Filed | May 26, 1969 |
| [45] | Patented | Sept. 21, 1971 |
| [73] | Assignee | Sandoz Ltd.<br>Basle, Switzerland |
| [32] | Priority | June 5, 1968 |
| [33] | | Switzerland |
| [31] | | 8317/68 |

[54] PROCESS FOR THE REDUCTIVE CLEAVAGE OF SULPHONIC ACID GROUPS FROM ANTHRAQUINONE-SULPHONIC ACIDS
12 Claims, No Drawings

[52] U.S. Cl. .................................................. 204/73, 260/378, 260/383

[51] Int. Cl. .................................................. C07b 29/06, C07c 45/00, C07c 87/64

[50] Field of Search .......................................... 204/72, 73; 260/378, 383

[56] References Cited
UNITED STATES PATENTS

| 1,055,103 | 3/1913 | Vagt ............................ | 204/73 |
| 1,102,827 | 7/1914 | Vagt ............................ | 204/73 |
| 1,724,928 | 8/1929 | Hailwood ..................... | 204/73 |

OTHER REFERENCES

The Chemistry of Synthetic Dyes and Pigments by Lubs, reprint by Hafner Pub. Co., New York 1965 pg. 354– 356

*Primary Examiner*—F. C. Edmundson
*Attorney*—Littlepage, Quaintance, Wray & Aisenberg ABSTRACT: The invention relates to an electrochemical reductive desulphonation of anthraquinone-βsulphonic acids which contain an electron donator as substituent in at least one α-position of the nuclei bearing the sulphonic acid groups.

PROCESS FOR THE REDUCTIVE CLEAVAGE OF SULPHONIC ACID GROUPS FROM ANTHRAQUINONE-SULPHONIC ACIDS

An electrochemical method for the reductive cleavage of sulfonic acid groups in the α-position of anthraquinone-α-sulfonic acids is disclosed in British Pat. No. 273,043 but no previous way was found to split off the group in the β-position of anthraquinone-β-sulfonic acids by this means.

It has now been found that anthraquinone-β-sulfonic acids which contain an electron donator as substituent in at least one β-position of a β-sulfonic-acid-group-bearing nucleus can be reductively desulfonated by electrochemical means.

Besides the electron donator groups in the α-position and the sulfonic acid groups in the β-position, the starting anthraquinones may bear any other desired substituents, preferably nonwater-solubilizing substituents, e.g. halogen atoms, in particular fluorine or bromine atoms hydroxyl, thiol, amino, alkylamino, cycloalkylamino, arylamino, cyano, alkyl, alkoxy, aryl or arlyoxy groups. Preferred aryl radicals are phenyl radicals which in turn may be substituted, e.g. by fluorine, chlorine or bromine atoms or by hydroxyl, alkyl, alkoxy or cyano groups. Heterocyclic radicals of aromatic character, e.g. benzimidazolyl, benzoxazolyl or benzthiazolyl radicals, may be attached to the anthraquinone molecule, preferably through a sulfur atom.

Examples of suitable electron donators occupying one of the α-positions of anthraquinone-β-sulfonic acids are hydroxyl groups, lower alkoxy groups, e.g. methoxy or ethoxy groups, unsubstituted amino groups, amino groups bearing organic radicals such as lower alkyl radicals, or optionally substituted phenyl radicals, thiol groups, mercapto radicals of the aliphatic or aromatic series, e.g. the benzene series.

The aforementioned starting compounds can be derived from anthraquinone-β-sulfonic acids bearing substituents in α-positions which are reduced to electron donators in the same process. The nitro derivatives may be mentioned as a simple, nonlimitative example, which can be reduced to amino derivatives and reductively desulfonated in the same operation.

A single anthraquinone-β-sulfonic acid or a mixture or different anthraquinone-β-sulfonic acids can be submitted to the reductive β-desulfonation process.

This electrochemical reductive process is conducted in the known way at the cathode in a one-cell or multicell apparatus. The cathode may be inside walls and/or the bottom of the reduction vessel, or it may be formed by several strips of sheet metal or metal rods immersed in the electrolyte, which can be exchanged or regulated in depth of immersion during the reduction process. Alternatively, liquid cathodes can be used, e.g. mercury, gallium or liquid amalgams.

Suitable solid cathode materials are coal or various metals in the form of bright rolled sheet or sponge, e.g. platinum, tungsten, lead, antimony, gold, nickel, tantalum palladium silver, tin, zinc, manganese, copper, cadmium, thallium, as well as alloys, e.g. copper alloys, oxides, e.g. lead dioxide. Preferably, cathodes made of lead, mercury, platinum or copper amalgam are used. The anode, which is preferably separated from the cathode region by at least one diaphragm or by a coating acting as a diaphragm, can be made of any of the materials employed for this purpose, e.g. graphite, coal, lead, lead dioxide, iron, nickel, platinum or platinized titanium. The reaction can be conducted in solution or in suspension, which is preferable at high dye concentrations. In the latter case it is advisable to provide for good circulation of the reaction suspension by the use of pumps or mechanical stirrers; the pumping or stirring system should be so devised that its effect is greatest on the cathode of the system. The voltage can be supplied by any desired type of direct current generator, for instance a battery, or an alternating current generator fitted with a rectifier. The voltage between the anode and the cathode can be varied to suit the materials used for the electrodes and the distance between them, the amperage, the concentration of electrolyte and the state of reduction, using for example a potentiostat. Generally the system is operated in the voltage region on 1 to 25 volts, or preferably 2.5 to 6 volts for a concentrated alkalihydroxide electrolyte. It is of advantage to increase the voltage gradually or stepwise during the reaction. Generally, the reaction is carried out at temperatures in the range of 10° to 90° C. or, preferably, 30° to 70° C., normally in aqueous alkaline medium. If more than one sulfonic acid groups is present in the β-positions of the anthraquinone molecule, they can be split off simultaneously or consecutively by appropriate control of the pH value, the temperature and the voltage.

In the following Examples the parts are by weight and the temperatures in degrees centigrade.

Example 1

In a copper vessel of 20 cm. diameter and 20 cm. height with amalgamated inside walls a mixture of 100 parts of 1,5-diamino-4,8-dihydroxy-2-(4'-hydroxyphenyl)-anthraquinone-7-sulfonic acid and 105 parts of 1,5-diamino-4,8-dihydroxy-2-(4'-methoxyphenyl)-anthraquinone-7-sulfonic acid in 1100 parts of water and 23 parts of 25 percent ammonium hydroxide solution is stirred to form a homogeneous suspension. An anchorshaped stirrer of V4A steel is used with outer arms extending to 5 mm. distance from the wall of the vessel. A clay cell of 8 cm. outside diameter and 20 cm. height is fitted between the axis of the stirrer and its outer arms; the hollow cell contains a graphite anode of 13 mm. diameter and it is filled with 10 percent sodium hydroxide solution.

The pH of the reaction mixture in the cathode room is adjusted to 12.5 with sodium hydroxide solution. The reaction mixture is raised to 60° and a direct current of 3.7 volts is directed from the copper wall of the vessel to the graphite anode.

At an effective cathode area of 1080 cm$^2$ a current intensity of 5 amperes is reached. The reaction is conducted for 8 hours with vigorous stirring under these conditions and at constant current intensity while the voltage is gradually increased to 4.7 volts. When chromatographic control indicates that the starting compounds have completely disappeared the reaction mixture is cooled to 35°, adjusted to pH 7 with hydrochloric acid and filtered. The filter residue is washed with water until the waste runs clear and is then dried. The product is 172 parts of a mixture of equal parts of 1,5-diamino-4,8-dihydroxy-2-(4'-hydroxyphenyl)-anthraquinone and 1,5-diamino-4,8-dihydroxy-2-(4'-methoxyphenyl)-anthraquinone.

Example 2

100 Parts of 1-amino-4-phenylamino-anthraquinone-2-sulfonic acid and 35 parts of 30 percent sodium hydroxide solution are stirred in 1500 parts of water for 1 hour at 95°. The suspension is then run into a glass vessel with a capacity of 3,000 parts by volume, containing as cathode a spiral rolled amalgamated copper sheet of 100×16 cm. and of 0.5 mm. gauge. The diaphragm is a clay cell of 10 cm. outside diameter set in the center of the glass and filled with 555 parts of 10 percent sodium hydroxide solution. A graphite anode of 1.3 cm. diameter is immersed in this liquid. The reaction mixture in the cathode room is circulated by means of a pump. A direct current of 3 volts is run between the copper cathode and the graphite anode giving a current intensity of 1.5 amperes. The reaction is conducted for 4 hours at 30°, after which reduction is carried out over 8 hours at 50–55°. Then 32 parts of 30 percent sodium hydroxide solution are added and the reaction brought to a close in a further 8 hours. The product is filtered off, washed with water until the waste water runs clear and neutral and dried. 70 parts of 1-amino-4-phenylamino-anthraquinone are obtained.

In column A of the following table further anthraquinone-β-sulfonic acids are listed which can be desulfonated to the compounds listed in column B by procedures analogous to those described in Examples 1 and 2.

| Example Number | A | B |
| --- | --- | --- |
| 3 | 1-amino-4-(4'-methoxy-phenylamino)-anthraquinone-2-sulphonic acid. | 1-amino-4-(4'-methoxy-phenylamino)-anthraquinone. |
| 4 | 1-amino-4-cyclohexylamino-anthraquinone-2-sulphonic acid. | 1-amino-4-cyclohexylamino anthraquinone. |
| 5 | 1-amino-4-(2'-carboxyphenyl amino)-anthraquinone-2-sulphonic acid. | 1-amino-4-(2'-carboxyphenylamino)-anthraquinone. |
| 6 | 1,5-diamino-4,8-dihydroxy anthraquinone-3,7-disulphonic acid. | 1,5-diamino-4,8-dihydroxy anthraquinone-3-sulpohnic acid. |
| 7 | 1,8-diamino-4,5-dihydroxy anthraquinone-3,6-disulphonic acid. | 1,8-diamino-4,5-dihydroxy anthraquinone-3-sulpohnic acid. |
| 8 | 1,5-diamino-4,8-dihydroxy anthraquinone-3,7-disulphonic acid. | 1,5-diamino-4,8-dihydroxy anthraquinone. |
| 9 | 1,8-diamino-4,5-dihydroxy anthraquinone-3,6-disulphonic acid. | 1,8-diamino-4,5-dihydroxy anthraquinone. |
| 10 | 1,5-diamino-4,8-dihydroxy-2-(4'-ethoxyphenyl)-anthraquinone-7-sulphonic acid. | 1,5-diamino-4,8-dihydroxy 2-(4'-ethoxypehnyl)-anthraquinone. |
| 11 | 1,5-diamino-4,8-dihydroxy-2-[4'-(2''-ethoxy)-ethoxyphenyl]-anthraquinone-7-sulphonic acid. | 1,5-diamino-4,8-dihydroxy-2-[4'-(2''-ethoxy)-ethoxyphenyl]-anthraquinone. |
| 12 | 1,5-diamino-4,8-dihydroxy-2-[4'-(2''-dimethylamino) ethoxyphenyl]-antrhaquinone-7-sulphonic acid. | 1,5-diamino-4,8-dihydroxy-2-[4'-(2''-dimethylamino) ethoxpehnyl]-anthraquinone. |
| 13 | 1,5-di-(methylamino)-4,8-dihydroxy-anthraquinone-3,7-disulphonic acid. | 1,5-di-(methylamino)-4,8-dihydroxy.anthraquinone. |
| 14 | 1-amino-4,8-dihydroxy-5-methylamino-anthraquinone-3,7-disulphonic acid. | 1-amino-4,8-dihydroxy-5-methylamino-anthraquinone. |
| 15 | 1,8-di-(methylamino)-4,5-dihydroxy-anthraquinone-3,6-disulphonic acid. | 1,8-di-(methylamino)-4,5-dihydroxy-anthraquinone. |
| 16 | 1-aminoanthraquinone-2-sulphonic acid. | 1-aminoanthraquinone. |

Having thus disclosed the invention what I claim is:

1. A process for β-sulfonic acid group reductive cleavage from an anthraquinone-β-sulfonic acid α-substituted by an electron donator in the sulfonic-acid-group-bearing nucleus, which process consists of electrochemical cleavage under a voltage sufficient to cleave at least one β-sulfonic acid group.

2. A process according to claim 1 which consists of electrochemical cleavage of at least one β-sulfonic acid group in a position adjacent to an α-substituted electron donator.

3. A process according to claim 1 wherein each α-substituted electron donator is a hydroxyl or amino group.

4. A process according to claim 1 which consists of electrochemical desulfonation of a mixture of different anthraquinone-β-sulfonic acids.

5. A process according to claim 1 wherein catholyte for the electrochemical cleavage comprises an aqueous solution of an alkali metal hydroxide or of ammonium hydroxide.

6. A process according to claim 1, wherein the electrochemical cleavage is carried out on a cathode of coal, tungsten, antimony, gold, nickel tantalum, palladium, silver, tin, zinc, manganese, copper, gallium, cadmium, thallium, lead, mercury, platinum, copper amalgam or lead dioxide.

7. A process according to claim 1, wherein the electrochemical cleavage is carried out in the temperate range between 10° and 90° C.

8. A process according to claim 7, wherein the electrochemical cleavage is carried out in the temperature range between 30° and 70° C.

9. A process according to claim 6 in which the cathode is of copper amalgam.

10. A process according to claim 1, wherein the voltage is between 1 and 25 volts.

11. A process according to claim 10 wherein the voltage is between 2.5 and 6 volts.

12. A process according to claim 10 wherein the voltage is increased during the reductive cleavage.

UNITED STATES PATENT OFFICE
CERTIFICATE OF CORRECTION

Patent No. 3,607,686   Dated September 21, 1971

Inventor(s) PAUL BUECHELER

It is certified that error appears in the above-identified patent and that said Letters Patent are hereby corrected as shown below:

Covering page, line 2 of the Abstract, "βsulphonic" should read --β-sulphonic--. Column 1, line 6, "αposition" should read --α-position--; "αsul-" should read --α-sul- --; line 7, "273,043" should read --273,043,--; line 12, "β-position" should read --α-position--; line 18, "atoms hydroxyl" should read --atoms, hydroxyl--; line 40, "mixture or" should read --mixture of--; line 54, "tantalum palladium" should read --tantalum, palladium,--; line 55, ", oxides," should read --, or oxides,--; line 63, "The reaction" should begin a paragraph. Column 2, line 1, "on" should read --of--; line 7, "groups" should read --group--; line 36, "8hours" should read --8 hours--; line 54, start a paragraph with "The"; line 70, "neutral and" should read --neutral, and--. Column 3, example 10, in the definition of B, "ethoxypehnyl" should read --ethoxyphenyl--; example 12, in the definition of B, "ethoxpehnyl" should read --ethoxyphenyl--. Column 4, claim 6, line 3, "nickel tantalum" should read --nickel, tantalum--; claim 7, line 2, "temperate" should read --temperature--.

Signed and sealed this 20th day of March 1973.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,607,686      Dated September 21, 1971

Inventor(s) PAUL BUECHELER

It is certified that error appears in the above-identified patent and that said Letters Patent are hereby corrected as shown below:

Column 1, line 31, "radicals such as lower alkyl radicals, or" should read --radicals, such as lower alkyl radicals or--.

Signed and sealed this 3rd day of July 1973.

(SEAL)
Attest:

EDWARD M.FLETCHER,JR.      Rene Tegtmeyer
Attesting Officer      Acting Commissioner of Patents